United States Patent [19]

Nukala et al.

[11] Patent Number: 4,589,955
[45] Date of Patent: May 20, 1986

[54] FLUID RECOVERY SYSTEM

[75] Inventors: August R. Nukala, Galien; Arthur Perez, Buchanan; Timothy L. Brumfield, Niles, all of Mich.

[73] Assignee: RPR Filtration Systems, Inc., South Bend, Ind.

[21] Appl. No.: 520,798

[22] Filed: Aug. 5, 1983

[51] Int. Cl.$^4$ .................. C10G 7/00; C10G 31/09
[52] U.S. Cl. .................. 196/114; 196/121; 196/133; 196/134; 202/180; 202/190
[58] Field of Search .................. 196/46.1, 114, 121, 196/132, 134, 137, 135, 138, 133; 202/190, 244, 176, 180, 181; 34/75; 373/56; 165/118; 208/187; 203/23

[56] References Cited

U.S. PATENT DOCUMENTS

| 122,115 | 12/1871 | Guenther | 202/190 |
|---|---|---|---|
| 1,744,261 | 1/1930 | Cooke | 208/358 |
| 1,802,942 | 4/1931 | Govers | 196/114 |
| 1,931,838 | 10/1933 | Beraud | 202/180 |
| 2,028,967 | 1/1936 | Carlstrom | 196/133 |
| 2,408,639 | 10/1946 | Hickman | 203/23 |
| 2,451,668 | 10/1948 | Egger et al. | 196/114 |
| 3,139,391 | 6/1964 | Walker | 203/2 |
| 3,224,948 | 12/1965 | Akers | 202/180 |
| 3,249,438 | 5/1966 | Topol | 196/114 |
| 3,269,920 | 8/1966 | Merrill | 202/190 |
| 3,338,799 | 8/1967 | Brandt et al. | 203/23 |
| 4,113,571 | 9/1978 | Nygards | 202/176 |
| 4,341,599 | 7/1982 | Watson et al. | 202/176 |

FOREIGN PATENT DOCUMENTS 1102949 3/1961 Fed. Rep. of Germany ..... 196/46.1

Primary Examiner—Peter Kratz
Attorney, Agent, or Firm—Barnes & Thornburg

[57] ABSTRACT

A fluid recovery system for removing water and solid contaminants from a fluid such a lubricant oil, coolant, and lubricating oils and the like for manufacturing operations is disclosed. A cylindrical vacuum vessel is provided with a centrally disposed cylindrical heating unit and a heat exchanger coil surrounding the heating unit, within the confines of the vacuum vessel. A water condensation trapping cover seal arrangement is provided for the top of the vessel. A cylindrical filter is disposed in surrounding relationship to the heating unit.

4 Claims, 2 Drawing Figures

FLUID RECOVERY SYSTEM

BACKGROUND AND SUMMARY OF THE INVENTION

The present invention relates to a fluid recovery system. Especially preferred embodiments of the invention are directed at a fluid recovery system for recovery of fluid by means of vacuum distillation and filtration of used lubrication oil and the like. The system of the present invention is especially advantageous as a recovery system for quenching oils, cutting oils, water soluble coolant, hydraulic oils and the like used in industrial manufacturing processes. The assignee of the present application, RPR Filtration Systems, Inc. of South Bend, Ind., has several vacuum distillation and filtering machines of the type which the present invention is related to improving, including models R/E 60 and R/E 120-B.

Common to the prior art arrangements is the utilization of the concept of distilling the fluid to be dried or cleaned in a vacuum by heating the fluid, transporting the fluid through piping to a vacuum vessel and causing the fluid to cascade downward in a vacuum chamber of the vacuum vessel where it drops to the bottom. The fluid is then transported to a separate collection vessel or recirculated through the vacuum vessel in order to increase the rate of distillation. The vacuum distillation and separation of water from petroleum oils employs the just described cycle. However, when the fluid drops to the bottom of the vacuum vessel, it is transported by a circulating pump or exit pump to a collection tank for oil which has been processed and has the water removed. Typically, the vacuum in the vacuum chamber or vessel for distillation of petroleum oils is operated in the range of 22 to 28 inches of mercury (below atmospheric pressure) where the water boils in the range of 110° F. in the deepest vacuum condition to 152° F. at the 22 inches of mercury vacuum condition. Especially advantageous operations of such systems according to the present invention heat the water to 180° F. to facilitate volume operation.

The present invention is directed to an improved machine having a combination of features which increases the efficiency of operation, improves the ease of manufacture, eases the tasks of cleaning and removing water condensation at the upper part of the vacuum chamber, increases economization of total space required, and improves energy efficiency.

Preferred embodiments of the invention include a generally vertically extending vacuum chamber, a centrally disposed heating unit extending upwardly from the bottom of the vacuum chamber, an inlet spiral tube heat exchanger surrounding the heater assembly at the lower portion of the vacuum chamber and serving to facilitate pre-heating of the fluid to be processed before it is passed upwardly through the heater assembly, and a filter in surrounding relationship to the heater assembly for filtering out solid particles from the fluid as it is flowed outwardly from the top of the heating assembly and cascaded downwardly toward the bottom of the vacuum chamber. This overall combination results in an efficient use of space as well as economies of manufacture and conservation of energy.

In especially preferred embodiments, the filter arrangement is a cylindrical unit surrounding the correspondingly cylindrical heater unit at the center of the vacuum vessel. The filter can thus be easily changed and/or cleaned by simply removing the top cover of the vacuum chamber to gain access thereto.

Since the inlet coils for the fluid to be processed extend concentrically around the lower portion of the heater unit below the filter section and are immersed in the oil that has cascaded downwardly to the bottom of the vacuum chamber, both a pre-warming of the inlet oil and a pre-cooling of the processed oil is automatically and efficiently effected. In this connection, the processed oil which collects at the bottom of the chamber is advantageously cooled by the incoming oil so that this processed oil can be more readily immediately used for lubrication or other purposes than would be the case if it remained in its maximally heated condition.

By arranging the heater assembly as insertable from the bottom of the vacuum chamber, it can be readily installed and removed as a unit with a minimum of manufacturing expense. The cylindrical heating unit includes a tubular enclosure, inside of which are a plurality of vertically extending heating elements, the tubular enclosure accommodating the flow of the fluid to be treated from the bottom thereof upwardly through the tubular heating enclosure to outlet openings inside of the space surrounded by the filter adjacent the upper end of the vacuum chamber.

According to especially preferred embodiments of the invention, the fluid level at the bottom of the vacuum chamber vessel is controlled by dual floats, the lower float regulating the lowest point of the fluid level, the higher float monitoring the upper fluid level. Preferably, these floats are disposed externally to the vacuum chamber casing for ease of maintenance and assembly. The high float controls the inflow of fluid to the vacuum vessel and the lower float controls the outflow. The floats are preferably controlled by time circuits, by mechanical timing, or electronic timing. There may be delays so as to avoid rapid cycling of inflow or outflow devices, according to especially preferred embodiments.

An important feature of preferred embodiments of the present invention is the construction of a removable cover and seal for the vacuum chamber vessel. According to the invention, the upper edge of the vacuum chamber vessel is provided with a radially inwardly projecting offset for accommodating a seal in the form of an O-ring. The dome-shaped cover, which includes a fitting at the upper portion for connecting to the vacuum pump, is provided with a diameter corresponding to a diameter of the vacuum chamber vessel. The offset is so configured that the O-ring rests in place on top of the offset and when a vacuum is applied, the O-ring is drawn tightly to the tank top without requiring other fastening mechanisms. This arrangement has the distinct advantage of automatically accommodating for the experienced condensation of water vapors at the top cover of the vacuum vessel when the vacuum pumping is terminated. With conventional constructions, the moisture collects in droplets of water which travel by gravity down the side of the dome and the side of the tank into the fluid or oil which has already been processed. With the offset configuration of the present invention, the condensation collects at this offset, since the offset collects the water as it travels down the lower portion of the dome and prevents it from going further downwardly into the sidewalls of the vacuum vessel. This minimizes the amount of contamination by this condensation phenomena.

Another important feature of certain preferred embodiments of the invention is the provision of a sensor for controlling the heat in the heating vessel, which sensor extends from the bottom of the vessel through the centrally disposed heater and up into a position at the point of the heating unit where the fluid being processed exits the heater and enters the evacuated vacuum chamber space. With this arrangement the thermostat sensor is most sensitive to the critical temperatures at which the water is boiled off from the oil. Also, the sensor is sensitive to conditions of operations without fluid, whereby the sensor detects this condition immediately and turns the heater off, and thus avoids overheating. Similarly, when the fluid in the heating vessel may not be circulating, the same relationship occurs and the sensor would immediately detect same and appropriately control the heating unit.

With the arrangement of the heat exchanger and heating unit centrally of the vacuum chamber vessel, there is an improvement in operating efficiencies due to a reduction in heat losses through various stages and due to optimum heat exchange. Furthermore, the total space required for the machine is substantially reduced as compared with machines having different housing for the filter/heat exchanger/heating unit.

In particularly preferred embodiments a further temperature sensor is provided at the vacuum outlet line from the vacuum chamber, which further sensor effectively detects the level of dryness of the oil because the vapor temperature drops as the water content is reduced. This further sensor is operatively connected to shut down the machine when the desired dehydration has been reached. For start-up operations a manual bypass switch is provided to ensure that the machine first reaches operating temperatures at the vapor outlet.

Other objects, advantages, and novel features of the present invention will become apparent from the following detailed description of the single embodiment, when considered in conjunction with the accompanying drawing.

DETAILED DESCRIPTION OF THE DRAWING

Figure 1:
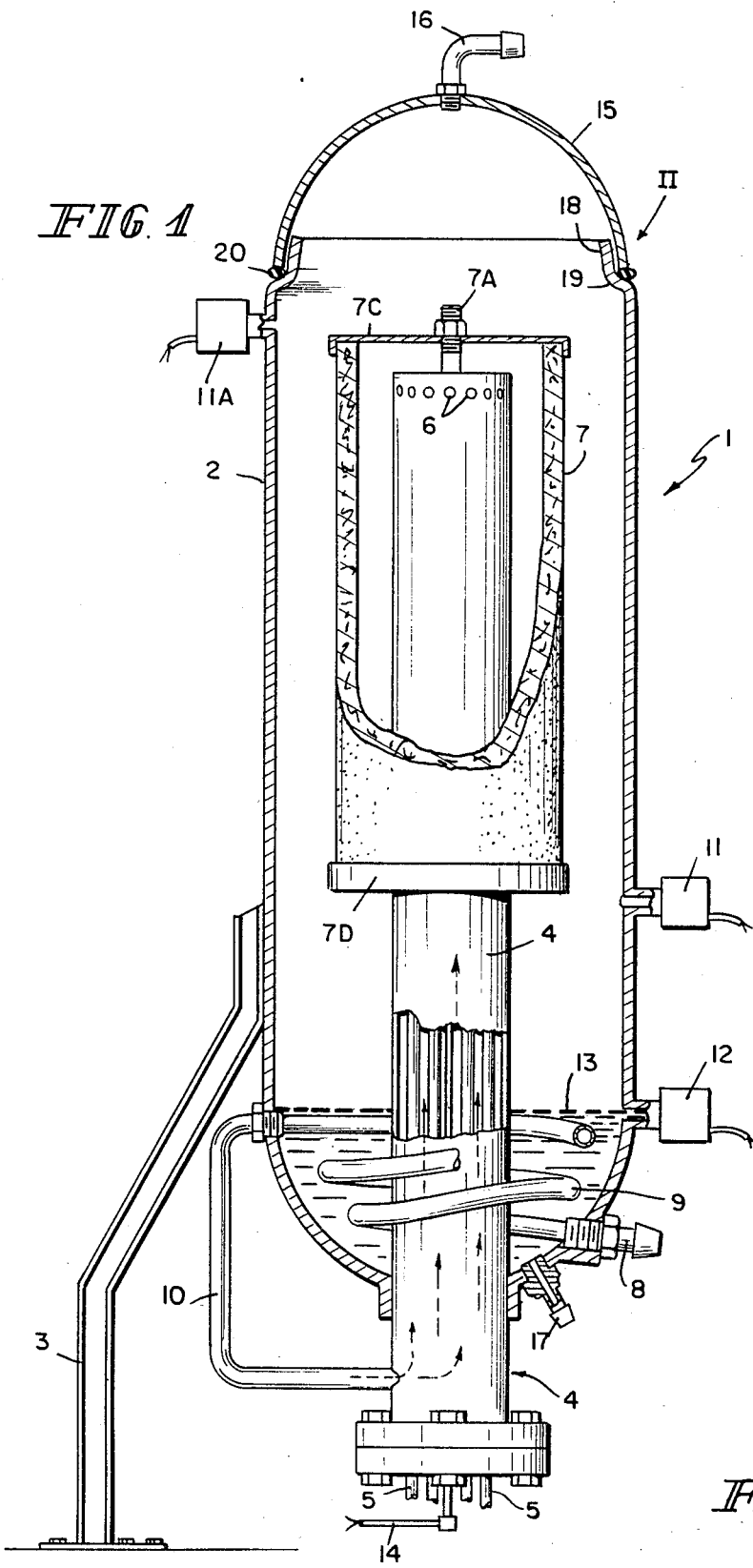
FIG. 1 is a schematic side part-sectional view showing a fluid vacuum distillation and filtration machine constructed in accordance with a preferred embodiment of the present invention.

FIG. 1 schematically illustrates a vacuum distillation and filtration machine 1 which includes a substantially cylindrical vacuum vessel 2 which is supported in a vertical position by support legs 3. It will be understood that three or four support legs 3 will be arranged around the vessel 2 to hold the same in an upright condition. Alternatively, the support legs 3 could be replaced by some type of portable arrangement including ground engaging wheels so that the machine could be moved readily from place to place.

A cylindrical heating unit 4 extends upwardly from underneath the vessel 2 and includes a plurality of electrical heating elements 5 which are energized by an electrical source, not shown. Inside the tubular casing for the heater 4 there is space around the heating elements 5 for accommodating the upward flow of oil or the like to be processed. At the top of the heater casing 4 there are outlet openings 6 through which the heated oil being processed flows to be cascaded downwardly therefrom. A cylindrical filter 7 is mounted adjacent the upper portion of the heater 4 and serves for filtering out any solid particles which may be in the fluid being processed as it comes out of the openings 6 from the heater 4.

A fluid inlet fitting 8 is connected to a source of oil or fluid to be processed and connects with a heat exchanger coil 9 which extends concentrically around the heater 4 at the lower portion of the vessel 2. The heat exchanger coil 9 communicates with a heater inlet connection tube 10 going into the heater casing 4.

An intermediate float assembly 11 and a lower float assembly 12 are disposed at the side of the tubular vessel 2 and serve to detect the liquid level and assist in the controlling of the level of the liquid, which collects at the bottom of the vessel 2, which level is depicted by reference character 13. An upper float assembly 11A is provided as a safety feature to control shutdown of the machine in the event it is inadvertently filled with liquid to that level, thus protecting the machine and environment from overflow. Each of the float assemblies include float operated switches to control pumps and/or solenoid valves at the respective lines being controlled.

A thermostat sensor element line 14 extends centrally up through the heater 4 and serves to detect the temperature within the vessel 2 at the highest temperature position.

The top of the vacuum vessel 2 is closed off by a dome-shaped cover 15 and includes a fitting 16 which is connected to a vacuum pump for applying vacuum to the vessel 2.

In addition to the vacuum pump, there is an outlet pump (not shown) connected to outline 17 to draw off the processed fluid for use/storage or for further recycling through the machine. For larger volume units where the vacuum pressure is insufficient to ensure an adequate volume of fluid inlet through inlet 8, a further inlet pump is provided. This inlet pump is preferably of the same size as the outlet pump so steady state flow can be easily maintained.

In operation, the oil or other fluid to be processed is fed via the inlet 8 into the heat exchanger coil 9 where it flows as indicated by the arrows in surrounding relationship to the heater casing 4, back downwardly along connecting pipe 10 and into the heater 4, thence upwardly to the outlet openings 6 at the top of the heater while it is being heated by the elements 5. The vacuum vessel 2 is subject to vacuum pressure by means of the connection at 16 so that vacuum distillation and removal of water is obtained. The filter 7 serves to trap any solid particles that may be in the oil exiting from the openings 6 as it cascades downwardly toward the bottom fluid level 13 in the vessel 2. This filter 7 can be periodically exchanged by merely shutting down the system and removing the dome cover 15 and removing and replacing the filter 7. For this purpose, filter 7 is clamped by thread rods 7A between removable plate 7C and plate 7D fixed to the tubular heater 4.

The float valve assemblies 11 and 12 control the respective level 13 of the fluid at the bottom of the vessel 2 by controlling the respective inflow and outflow of fluid via control of the line leading to inlet 8 and the outlet line 17, respectively.

Since the inlet oil is circulated upwardly through the processed oil accumulating at the bottom of the vessel 2, an advantageous heat exchange takes place. First, the heated processed oil heats up the incoming oil flow, thereby improving the efficiency of heating the oil as it is being processed through the centrally disposed heater 4. On the other hand, the already processed oil that is collecting at the bottom of vessel 2 is simultaneously cooled to a more usable temperature as a lubricant or for use in a chemical process or the like.

Figure 2:
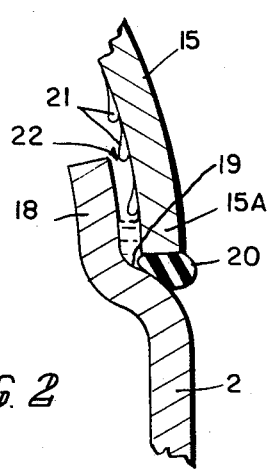
FIG. 2 is an enlarged schematic sectional view showing the details of section II from FIG. 1.

Referring to detail II of FIG. 1, illustrated in enlarged form in FIG. 2, the upper edge of the vacuum vessel 2 includes an offset portion 18 of slightly smaller radius, interconnected by a transition ledge 19. An O-ring seal 20 rests on this ledge 19. When vacuum is applied via connection 16, the dome 15 is pulled down to compress the O-ring 20 and form an effective seal against leakage from the vessel 2. When the vacuum pressure is released, the inherently naturally occurring accumulation of water condensation droplets 21 at the dome is trapped and accumulated between the offset 18 and the lower portion 15A of the dome cover, thereby preventing the droplets 21 from passing downwardly along the walls of the vessel 2 to contaminate the processed oil accumulating at the bottom of the vessel. The droplets 21 can easily be periodically removed by picking up the dome cover 15 and wiping the water droplets off. According to alternative preferred embodiments, the geometric configuration of the offset 19 with respect to the O-ring seal 20 is made such as to permit a leakage outwardly of the vessel 2 when the vacuum is not being applied.

While we have shown and described a single embodiment in accordance with the present invention, it is understood that the same is not limited thereto but is susceptible to numerous changes and modifications as would be known to those skilled in the art of the present disclosure and we therefore do not wish to be limited to the details shown and described therein but intend to cover all such changes and modifications as are encompassed by the scope of the appended claims.

What is claimed is:

1. A fluid recovery system for removing contaminants from a base fluid comprising:
    a vertically oriented vacuum vessel including a lower section, for accumulating said base fluid which has been vacuum distilled in said vessel, and a vacuum output line for removal of water vapor out said vacuum line;
    a fluid heater unit disposed centrally of said vacuum vessel for heating fluid to be distilled, said heater unit including fluid outlet opening means at an upper section of said vacuum vessel;
    a heat exchanger means within said vacuum vessel including heat exchange coils extending in said lower section of said vessel and immersed in said accumulated base fluid for exchanging heat between the accumulated fluid in said lower section and input fluid in said coils so as to preheat said input fluid and pre-cool said accumulated fluid, said input fluid being subsequently supplied to said fluid heater unit for additional heating prior to being distilled within said vacuum vessel to produce said base fluid;
    fluid supply means for supplying fluid to be processed to said heater unit via said heat exchange coils; and
    a dome-shaped cover for the vacuum vessel and an O-ring seal disposed between the cover and the top of the vessel, wherein the upper edge of the vacuum vessel includes a radially offset portion forming an outwardly facing ledge, said O-ring seal resting on said ledge.

2. A system according to claim 1, wherein said vacuum vessel is cylindrical and wherein said ledge is configured to accommodate tightening of the cover against the O-ring seal in response to vacuum pressure being applied to the vacuum vessel without need of further fastening means, said offset portion being spaced radially inwardly of the radially inward facing walls of the cover, whereby water droplets condensing on the cover upon termination of the vacuum pressure are trapped in the space between the cover and the offset portion, thereby preventing contamination of the fluid at the bottom of the vessel.

3. A fluid recovery system comprising:
    a vertically oriented vaccum vessel including a lower section, for accumulating fluid which has been vacuum distilled in said vessel, and a vacuum output line for removal of water vapor out said vacuum line;
    a dome-like cover closing off the top of said vacuum vessel; and
    wherein the upper edge of said vacuum vessel includes a radially offset portion forming an outwardly facing ledge means, wherein an O-ring seal is disposed on said ledge so as to be clampingly sealing engaged by a lower portion of said cover in response to application of vacuum pressure to said vessel to form an air-tight seal between said vessel and said cover during application of vacuum pressure and so as to permit water vapor condensation within said vacuum vessel to escape to the exterior of said vacuum vessel when vacuum pressure is not applied, said offset portion being spaced radially upwardly of the facing wall portion of said cover to prevent said water vapor condensation from dripping downwardly along the interior vessel walls and thereby prevent water droplet contamination at the accumulated processed fluid at the bottom of the vessel.

4. An apparatus for removing contaminants from a hydrocarbon base fluid comprising:
    vacuum vessel means, for vacuum vaporization of water and volatile contaminants from said base fluid, including a lower portion for accumulating said base fluid free of said contaminants and a vacuum line for removing said vaporized contaminants from said vacuum vessel means;
    fluid heater means, within said vacuum vessel means, for heating input base fluid containing said contaminants to facilitate vaporization of said contaminant from said base fluid;
    heat exchanger means, immersed in said base fluid accumulated in said lower portion, for substantially preheating said input fluid and pre-cooling said base fluid prior to supplying said input fluid to said heater means and prior to withdrawing said base fluid from said vacuum vessel, respectively; and
    filter means, removably disposed within said vacuum vessel means and circumferentially surrounding said heater means, for removing particulate contaminants from said input fluid;
    a dome shaped cover closing off the top of the vacuum vessel means and an O-ring seal disposed between the cover and the top of the vessel wherein the upper edge of the vacuum vessel includes a radially offset portion forming an outwardly facing ledge to receive the O-ring seal which forms an air tight connection between said ledge and said cover solely under the influence of applied vacuum pressure.

* * * * *